US006801971B1

(12) United States Patent
Devine et al.

(10) Patent No.: US 6,801,971 B1
(45) Date of Patent: Oct. 5, 2004

(54) METHOD AND SYSTEM FOR SHARED BUS ACCESS

(75) Inventors: Daniel J. Devine, Slatington, PA (US); James Guziak, Laurys Station, PA (US); Kevin J. Lynch, Slatington, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/394,029

(22) Filed: Sep. 10, 1999

(51) Int. Cl.[7] .............................................. G06F 13/00
(52) U.S. Cl. ..................... 710/107; 710/300; 710/305; 710/313
(58) Field of Search .............................. 710/1, 62, 63, 710/107, 112, 113, 300, 305, 309, 313; 709/100

(56) References Cited

U.S. PATENT DOCUMENTS

| | | | | |
|---|---|---|---|---|
| 5,375,215 A | * | 12/1994 | Hanawa et al. ............. | 711/169 |
| 5,485,586 A | * | 1/1996 | Brash et al. ............. | 340/825.5 |
| 5,535,340 A | * | 7/1996 | Bell et al. ................... | 710/107 |
| 5,535,395 A | | 7/1996 | Tipley et al. ............... | 395/725 |
| 5,596,729 A | | 1/1997 | Lester et al. ................ | 395/308 |
| 5,625,824 A | | 4/1997 | Melo et al. ................. | 395/728 |
| 5,774,744 A | | 6/1998 | Story et al. ................. | 395/847 |
| 5,790,869 A | | 8/1998 | Melo et al. ................. | 395/728 |
| 5,835,739 A | * | 11/1998 | Bell et al. ................... | 710/309 |
| 5,835,752 A | | 11/1998 | Chiang et al. .............. | 395/551 |
| 5,841,424 A | | 11/1998 | Kikinis ....................... | 345/168 |
| 5,845,151 A | | 12/1998 | Story et al. ................. | 395/847 |
| 5,874,581 A | | 2/1999 | Ataka et al. ................ | 395/290 |
| 5,889,970 A | | 3/1999 | Horan et al. ............... | 395/306 |
| 5,890,015 A | | 3/1999 | Garney et al. ................ | 395/82 |
| 5,930,487 A | | 7/1999 | Story et al. ................. | 395/300 |
| 6,086,430 A | * | 7/2000 | Amoni et al. ................ | 439/680 |
| 6,101,550 A | * | 8/2000 | Zucker ........................ | 709/239 |
| 6,131,135 A | * | 10/2000 | Abramson et al. .............. | 710/1 |
| 6,199,137 B1 | * | 3/2001 | Aguilar et al. .............. | 710/305 |
| 6,256,700 B1 | * | 7/2001 | Sauber ........................ | 710/315 |
| 6,324,613 B1 | * | 11/2001 | Aguilar et al. .............. | 710/316 |
| 6,359,951 B1 | * | 3/2002 | Morriss et al. ............... | 326/86 |
| 6,408,351 B1 | * | 6/2002 | Hamdi et al. .................. | 710/63 |

OTHER PUBLICATIONS

"Single–Board Intelligent Controller Performs Communication Tasks" Computer Design, Dec. 1978, p. 22.*

(List continued on next page.)

Primary Examiner—Xuan M. Thai
(74) Attorney, Agent, or Firm—Duane Morris LLP (57) ABSTRACT

An apparatus for controlling access to a PCI bus includes a plurality of USB host controllers, each capable of being connected to a respective USB port. A plurality of PCI cores are each coupled to respective ones of the USB host controllers. A PCI arbiter is coupled to each of the PCI cores. The PCI arbiter is capable of arbitrating multiple requests for the PCI bus, each request initiated by a communication from a respective one of the plurality of USB ports. Full-rate USB data transfer capability is provided between the PCI bus and each of the USB ports. The PCI arbiter receives a plurality of requests for the PCI bus from the PCI cores. A FIFO queue within the PCI arbiter stores a respective record corresponding to each of the PCI cores. A next one of the records is read from the FIFO queue. PCI bus access is granted to the PCI core identified in the next record. The apparatus may include a first plurality of USB ports, each coupled to a respective one of the USB host controllers. A breakout box may be coupled to the first plurality of USB ports. The breakout box is remotely positionable from the first plurality of USB ports. The breakout box includes a second plurality of USB ports, so that full-rate USB data transfer capability is provided between the PCI bus and each one of the second plurality of USB ports.

7 Claims, 6 Drawing Sheets

OTHER PUBLICATIONS

Intel® Universal Serial Bus (USB) Components, Questions and Answers, www.intel.com/desings/usb/faq.htm, p. 1–3.

Phoenix Technologies Ltd., Platform Solutions:USBAccess™, www.phoenix.com/platform/usbaccess.html, p. 1–3.

(05.97) Embedded Systems: To USB, or not to USB? (82:44.17), To USB, or not to USB?, May 1997, www.computer–design.com/Editorial/1997/05/embedded/597emusb.html, p. 1–7.

Intel Universal Serial Bus (USB) Component Family, The Universal Serial Bus: Signaling the Dawn of the Simple Peripheral Connection, www.intel.com/design/usb/usb-back.htm, p. 1–3.

PCI Local Bus Specification, Revision 2.2, Dec. 18, 1998, p. 68–69.

Open Host Controller Interface Specification for USB, Adopter's Agreement, Oct. 10, 1996.

Lucent Technologies, USS–312, Two–Port PCI–to–USB OpenHCI Host Controller, Jun. 1999, p. 1–40.

Universal Serial Bus Specification Revision 1.1, Chap 1–4, 10.

* cited by examiner

METHOD AND SYSTEM FOR SHARED BUS ACCESS

FIELD OF THE INVENTION

The present invention relates to computer system bus architecture.

DESCRIPTION OF THE RELATED ART

The implementation of sophisticated peripheral devices such as video graphics adapters, local area network interfaces, SCSI bus adapters, full motion video, redundant error checking and correcting disk arrays, and the like have provided major advances in the performance of personal computers (both workstation and network servers). These sophisticated peripheral devices have vastly increased data transfer rates. The peripheral devices' data transfer speeds are achieved by connecting the peripheral devices to the microprocessor(s) and associated system random access memory through high speed expansion local buses. Most notably, a high speed expansion local bus standard has emerged that is microprocessor independent and has been embraced by a significant number of peripheral hardware manufacturers and software programmers. This high speed expansion bus standard is called the "Peripheral Component Interconnect" or "PCI" A more complete definition of the PCI local bus may be found in the PCI Local Bus Specification, revision 2.2; PCI/PCI Bridge Specification, revision 1.0; PCI System Design Guide, revision 1.0; and PCI BIOS Specification, revision 2.1, the disclosures of which are hereby incorporated by reference. These PCI specifications are available from the PCI Special Interest Group, 2575 N. E. Kathryn #17, Hillsboro, Oreg. 97214.

The PCI bus is a mezzanine bus between the host or local bus in the computer, to which are connected the processor, memory, and the I/O bus, such as ISA or EISA. The bus was designed to have a high throughput and to take advantage of the increasing number of local processors that support I/O functions. For example, most disk controllers, particularly SCSI controllers, and network interface cards (NICs) include a local processor to relieve demands on the host processor. Similarly, video graphics boards often include intelligent graphics accelerators to allow higher level function transfer. Typically these devices have the capability of operating as bus masters, to allow them to transfer data at the highest possible rates.

Because of the number of potential devices trying to be bus masters, an arbitration scheme is required. A common arbitration scheme is least-recently-used (LRU). In certain cases, such as described in U.S. Pat. No. 5,535,395, entitled "Prioritization of Microprocessors in Multiprocessor Computer Systems," which is hereby incorporated by reference, the LRU scheme is modified so that the LRU of just the various requesters is used.

One of the types of devices that may be connected to the PCI bus is a Universal Serial Bus (USB) host controller. USB is a cable bus that supports data exchange between a host computer (USB host) and a wide range of simultaneously accessible peripherals (USB devices). USB supports a maximum data rate of 12 megabits/second.

The USB host controller provides access to the USB devices in the system. The host controller performs several duties with regard to the USB and its attached USB devices. These duties include reporting and managing the states of the USB devices, converting protocol and data information between a native format and a bit stream transmitted on the USB, frame generation, processing requests for data transmission, and transmission error handling.

USB allows up to 127 devices to run simultaneously on a computer, with peripherals such as monitors and keyboards acting as additional plug-in sites, or hubs. The USB physical interconnect is a tiered star topology. A hub is at the center of each star, and acts as a concentrator. A hub has a single upstream port in communication with the host controller and a plurality of downstream ports. Each downstream port allows connection to another hub or a function (device). Each wire segment is a point-to-point connection between the USB host and a hub or a USB device, or a hub connected to another hub or USB device. Conventional USB systems permit only a single host capable of communicating with the PCI bus at a rate of 12 megabits/second. When a hub is connected to the USB port, the available 12 megabits/second bandwidth is divided among the downstream ports. Thus, if a single hub having four downstream ports is used, the four downstream ports would each only provide an average of three megabits/second or less.

SUMMARY OF THE INVENTION

The present invention is a method and apparatus for controlling access to a bus. A plurality of requests for the bus are received from a plurality of requesters. A respective record is stored in a FIFO queue corresponding to each of the requestors. A next one of the records is read from the FIFO queue. Bus access is granted to the one of the requestors identified in the next record.

Another aspect of the invention is a method and apparatus for controlling access to a PCI bus. An arbiter arbitrates multiple requests for a PCI bus. Each request is initiated by a respective communication from a respective one of a plurality of USB ports. Full-rate USB data transfer capability is provided between the PCI bus and the plurality of USB ports.

Still another aspect of the invention is a breakout box. The breakout box includes a housing having a plurality of USB ports connected thereto, and a plurality of cables. Each of the plurality of cables is connected at a first end to a respective one of the USB ports. Each of the plurality of cables has a second end remote and separately positionable from the housing. The second end of each of the plurality of cables has a respective USB terminal connected thereto. Each of the plurality of cables provides full-rate USB data transfer capability.

DETAILED DESCRIPTION

Figure 1:
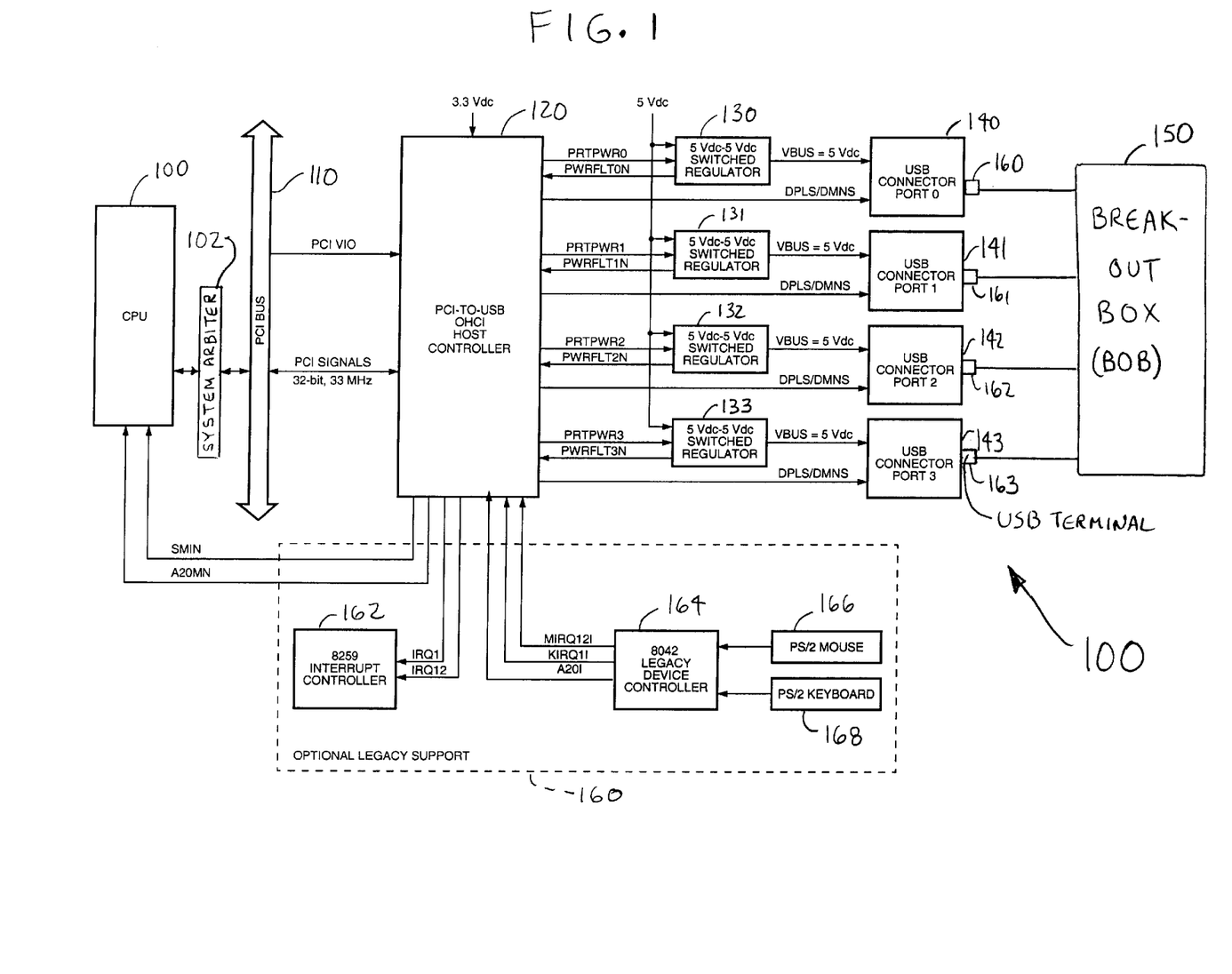
FIG. 1 is a block diagram of an exemplary system according to the present invention.

FIG. 1 shows an exemplary computer system 100 according to the invention. The system 100 has a central processing unit (CPU) 100 with a PCI bus 110 that handles peripheral device communications. The CPU may be, for example, a "PENTIUM™" or "PENTIUM III™" processor manufactured by the Intel Corporation of Santa Clara, Calif. The CPU 100 has a system bus (not shown) by which the CPU 100 communicates with the main system memory (not shown) and the PCI bus 110. A system arbiter 102 controls communications on the PCI bus 102 (i.e., determines when the bus is busy, when a grant signal can issue, etc.). The system arbiter sees all the entities that are requesting the PCI bus (of which the host controller 120 is only one) and is responsible for issuing a grant of access to the bus. The system arbiter is a conventional component of the PCI bus, and is often referred to in other contexts as the "PCI arbiter," but in the present application, the term "PCI arbiter" specifically refers to a separate function described below with reference to FIGS. 2, 4 and 5.

A PCI-to-USB Open Host Controller Interface (OHCI) Host Controller 120 provides a full-rate USB communications interface between the PCI bus 110 and each of a plurality of USB connector ports 140–143. Unlike host controllers or USB hubs of the prior art, OHCI Host Controller 120 can simultaneously interface four USB ports 140–143 to a single PCI bus 110, while providing 12 megabyte/second communications with each of the USB ports.

The OHCI host controller 120 provides a single-chip four-port PCI-to-Universal Serial Bus (USB) solution. The OHCI host controller 120 interfaces directly to the 32-bit, 33 MHz PCI bus 110. It can easily be configured to communicate in either a 3 V PCI environment or 5 V PCI environment simply by selecting the appropriate communications voltage level on the VIO input pin.

The OHCI host controller 120 provides four downstream USB ports 140–143 for connectivity with any USB compliant device or hub. Full-speed or low-speed peripherals are supported along with all of the USB transfer types: control, interrupt, bulk, or isochronous. The OpenHCI compliance of OHCI host controller 120 offers significant USB performance benefits and reduced CPU overhead compared to other USB UHCI host controllers. In addition, the OHCI host controller 120 offers a significant performance advantage over all other USB host controllers (both UHCI and OHCI) by providing full USB bandwidth to each port rather than sharing the USB bandwidth over all ports. This results in an increase in the number of devices which can feasibly be connected to a computer system as well as ensuring high-bandwidth devices, such as video cameras and audio devices, are always provided with the high bandwidth they need while other USB devices are in use.

The exemplary OHCI host controller 120 is fully compatible with the Microsoft Windows standard OpenHCI drivers. The OHCI host controller 120 may be fabricated in 0.25 mm technology. Integrated dual-speed USB transceivers may be used to provide a single-chip PCI-to-USB solution.

A breakout box (BOB) 150 provides a convenient module for providing USB ports that are positionable remotely and independently from the computer. For example, the USB ports 140–143 may be positioned on the back of the computer housing 10 (shown in FIG. 6). The breakout box 150 may be connected to the USB ports 140–143 positioned on a table or desktop. The breakout box 150 provides USB ports (shown in FIG. 6) with the same data rates that are available from ports 140–143. Breakout box 150 is described in greater detail below.

The exemplary OHCI Host Controller 120 is a 3.3 Volt device, and is connected to a 3.3 Volt source. The USB connector ports 140–143 use differential voltage from respective 5 Volt switched regulators 130–133.

Also included in the OHCI host controller 120 are legacy interfaces 160, as defined in the OpenHCI Open Host Controller Interface Specification for USB Release 1.0a, which is incorporated by reference herein in its entirety. The legacy interfaces 160 may include a legacy device controller 164, which may, for example, interface to a PS/2 mouse 166 and a keyboard 168. This legacy interface along with standard USB BIOS drivers allows USB mice and keyboards to operate in MS-DOS mode. Legacy support need not be implemented by the system designer if not desired. If not implemented, A20I, MIRQ12I and KIRQ12I are connected to a stable logic level.

Figure 2:
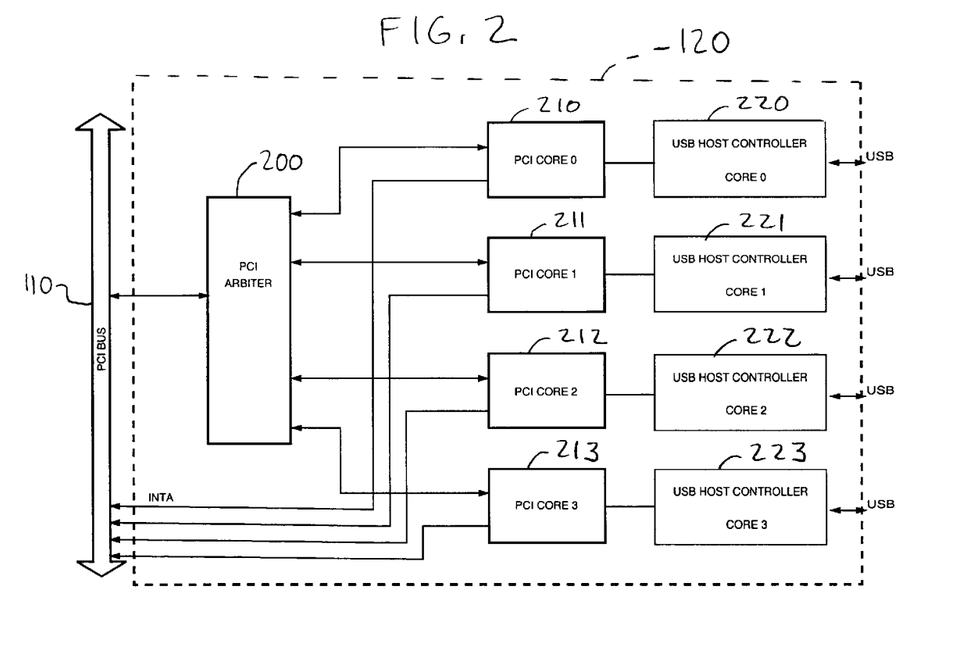
FIG. 2 is a block diagram of the PCI-to-USB OHCI host controller shown in FIG. 1.

FIG. 2 is a block diagram of an exemplary OHCI host controller 120. To provide full 12 megabit/second bandwidth to each of the USB ports, OHCI host controller 120 includes a plurality of USB host controllers 220–223, each complying with the OpenHCI Open Host Controller Interface Specification for USB Release 1.0a. Jul. 31, 1997, which is incorporated by reference herein in its entirety. Each of the USB host controllers 220–223 is coupled to a respective PCI core 210–213

The OHCI host controller 120 is a multifunction PCI device with one single-port USB host controller 220–223 per PCI core 210–213. There are four PCI cores 210–213 in the exemplary OHCI host controller 120 corresponding to a total of four single-port USB host controllers 220–223. Each single-port host controller is dedicated the full USB bandwidth available for any devices connected downstream of its one port. Each USB host controller 220–223 is capable of being connected to a respective USB port 140–143.

Figure 3:
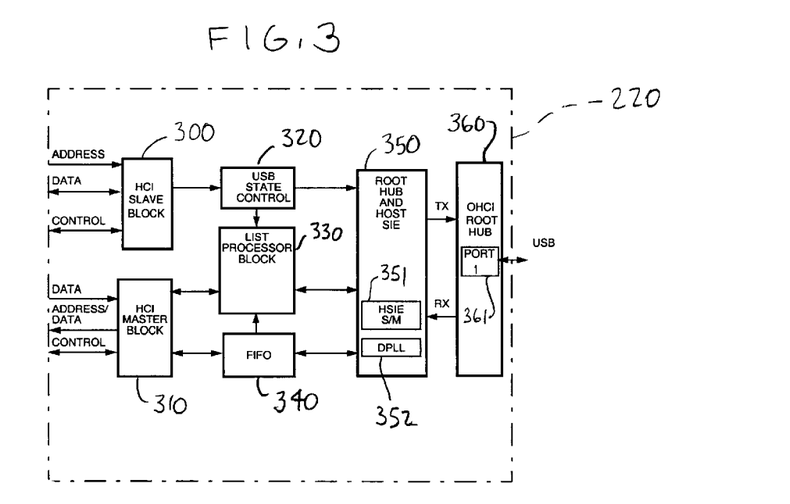
FIG. 3 is a block diagram of one of the USB host controllers shown in FIG. 2.

FIG. 3 is a detailed block diagram of an exemplary USB host controller 220 suitable for use in the OHCI host controller 120. The root hub 360 has a single port 361 connected to it. Root hub 360 handles all of the serial interface with the USB and essentially turns the USB data into parallel data and passes the parallel data.

The root hub and host serial interface engine (SIE) 350 is coupled to, and works with, the root hub 360. The host SIE 350 includes a Host SIE (HSIE) state machine (S/M) 351 and the digital phase locked loop (DPLL) 352. HSIE S/M 351 controls the root hub and host SIE module 350. DPLL 352 includes a plurality of gates which lock up to edges of the data that is coming in sequentially. Once DPLL 352 locks-up to that data it converts it to parallel data, which exits from the left side of DPLL 352. The root hub and host SE module 350 is able to lock on the data and sequence it through various events. For example, module 350 recognizes various bus states, and it keeps track of them.

A first-in, first-out (FIFO) queue 340 is used for bidirectional data, to or from USB port 361. The data go through the FIFO 340 and are stored there before being sent out on USB 361. The FIFO includes a plurality of multiplexers which control the direction in which the data are going.

The list processor 330 is a very large section including logic that controls operation of the host controller 220. List processor 330 includes data structures which exist in the host random access memory (RAM). List processor 330 takes a plurality of link lists of various types. The list processor 330 is the engine which goes out and reads and writes from that list. List processor 330 reads data to see what it has to do and passes the results out to that memory as well.

The USB state controller 320 is integrated into the list processor, and controls certain states, acting like an operating system. These are general host controller states, (e.g., whether the system is in the operational state, the reset state, the suspended state or resumed state.) USB state controller 320 controls getting into the state what is to be done while in that state.

The HCI slave block 300 is the block in which all of the registers that are presented to the operating system are stored. The operating systems controls the host controller by way of the registers of the slave block 300. The registers pass information into any of the other blocks identifying what things have to be done based on that read or write, etc. The HCI master block 310 acts like a DMA controller in which a list processor tells the master block it needs to go get something on the bus. For example, the list processor 330 may tell the master block 310 to go get descriptor information, to go read the list. The list processor 330 gets the information and the HCI master block 310 goes out and gets it. HCI master block 310 usually comes back and presents data to the list processor 330, and may present it to the FIFO 340.

Any further details of the USB host controller 220 that may be used by one of ordinary skill in the art to fabricate the host controller may be found in the *Universal Serial Bus Specification Revision* 1.1 *and the OpenHCI, Open Host Controller Interface Specification for USB, Release* 1.0a, Compaq/Microsoft/National Semiconductor, both of which are expressly incorporated by reference herein in their entireties.

In the exemplary embodiment, the USB Host Controllers 220–223 are UHOSTC host controllers from Phoenix Technologies, Ltd., of Norwood, Mass.; the PCI cores 210–213 are PCI Synthesizable Core from Phoenix Technologies, and the "glue" coupling each host controller 220–223 to its respective PCI core 210–213 includes a PCI2USB Controller, also manufactured by Phoenix Technologies. (The "glue" translates commands between the PCI core syntax and the USB host controller syntax.) Alternatively, other USB host controllers, PCI cores, and "glue" that conform to the above mentioned PCI and USB specifications may be used.

Referring again to FIG. 2, a PCI arbiter 200 is coupled to each of the plurality of PCI cores 210–213. The PCI arbiter 200 is capable of arbitrating multiple requests for the PCI bus 110, each request being initiated by a respective communication from a respective one of the plurality of USB ports 140–143, wherein full-rate USB data transfer capability is provided between the PCI bus and each of the USB ports.

PCI arbiter 200 is distinguished from the system arbiter 102 (which is referred to in other contexts as a PCI arbiter). The system arbiter 102 sees all the entities that are requesting the PCI bus 110, including other requestors besides the OHCI host controller 120. System arbiter 102 determines when the bus can be made available (i.e., when to issue a grant).

The exemplary PCI arbiter 200 may be part of a different chipset from the system arbiter 102. PCI arbiter 200 provides a second tier of arbitration. PCI arbiter 200 talks to the PCI bus 110. PCI arbiter 200 has to request to get on the PCI bus 110, and when it gets a grant back from the system arbiter 102, PCI arbiter 200 passes the grant through to the appropriate PCI core 210–213. PCI arbiter 200 determines which one of the PCI cores 210–213 should have the chance to get on the PCI bus 110, but it does not control when the PCI bus 110 is actually free (That task is performed by the system arbiter 102.)

Figure 4:
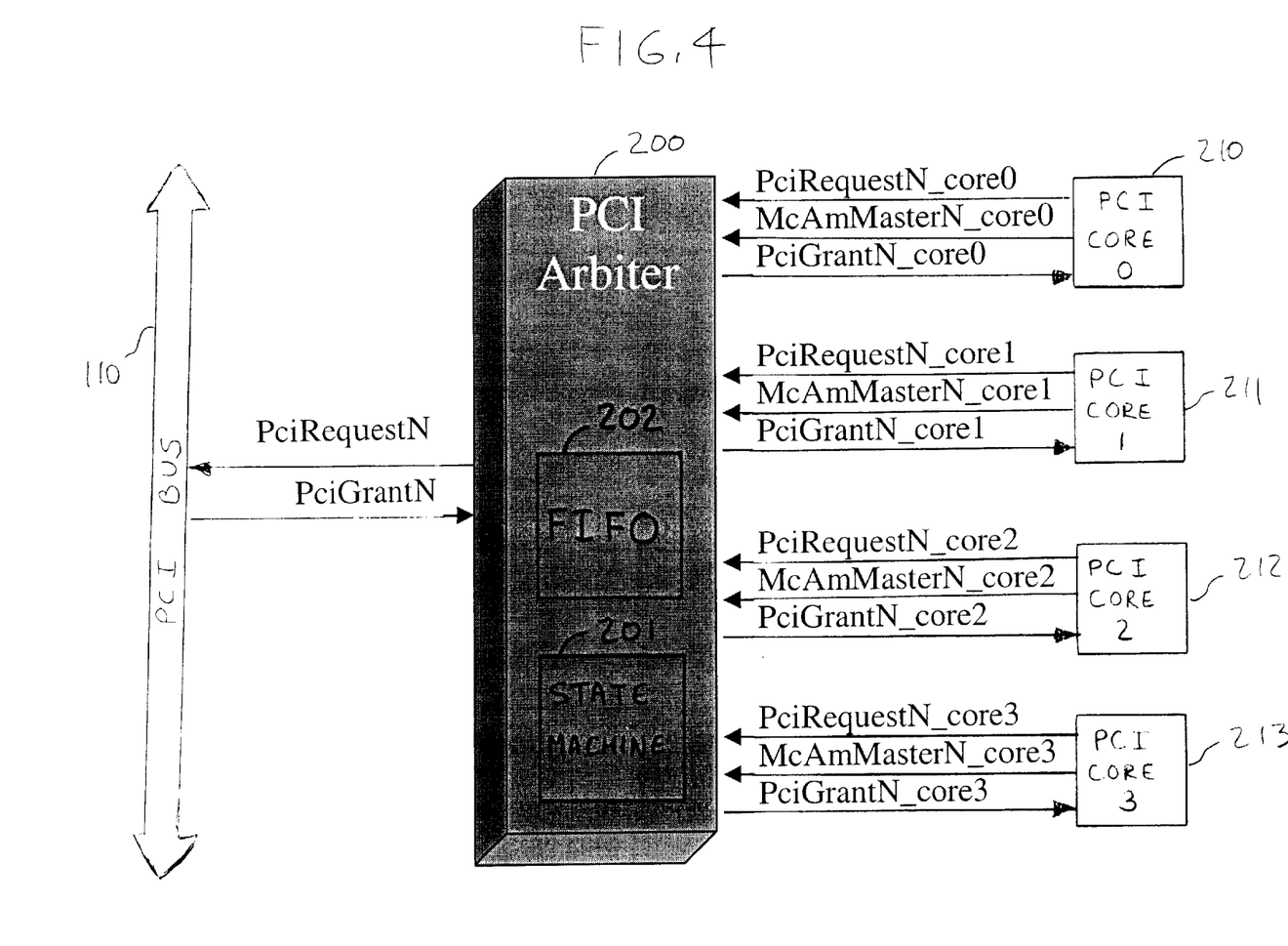
FIG. 4 is a data flow diagram showing the control signals used for arbitration among the plurality of PCI cores and the PCI bus shown in FIG. 1.

FIG. 4 is a data flow diagram showing the communications between the PCI arbiter 200 and the four PCI cores 210–213, and the communications between the PCI arbiter 200 and the PCI bus 110. The PCI arbiter 200 receives a plurality of PCI request signals (PciRequestN_core0, PciRequestN_core1, PciRequestN_core2, and PciRequestN core3) for the PCI bus 110 from a plurality of requestors, which in this example are PCI cores 210–213, respectively. The requests are stored in respective records in a FIFO queue 202. Each stored record corresponds to a respective one of the requestors (PCI cores 210–213.)

The PCI arbiter 200 submits a request for the PCI bus (PciRequestN) to the system arbiter 102 (shown in FIG. 1) via the PCI bus 110. The system arbiter 102 is notified that the PCI arbiter 200 is requesting the PCI bus 110 on behalf of some requester; the system arbiter 102 does not need to know which of the four PCI cores 210–213 is requesting the bus. The system arbiter 102 arbitrates between requests by the PCI arbiter 200 and any other users of the PCI bus 110. When the system arbiter 102 determines that the request submitted by the PCI arbiter 200 is to be granted, the system arbiter 102 issues the grant (PCIGrantN) signal to PCI arbiter 200.

The PCI arbiter 200 determines to which of the four PCI cores 210–213 bus access is to be provided next. PCI arbiter 200 issues a grant signal (PciGrantN_core0, PciGrantN_core1, PciGrantN_core2, or PciGrantN_core3) to the appropriate one of the PCI cores selected to receive the grant. When the selected PCI core receives the grant signal, it asserts its own bus master signal (McAmMasterN_core0, McAmMasterN core1, McAmMasterN_core2, or McAmMasterN_core3). The bus master signal indicates that the PCI core is acting as the bus master, and the PCI core continues to assert this signal until it completes its transmission on the PCI bus 110. When the PCI core is finished using the PCI bus, it deasserts the bus master signal.

The exemplary PCI arbiter 200 is implemented using a state machine 201 and a FIFO queue. While one of the PCI cores 210–213 is a bus master, any other PCI core may request the PCI bus 110. To maintain a fair first-come first-served interface, a FIFO queue 202 is used to allow the PCI arbiter 200 to remember the order in which the PCI cores 210–213 request the PCI bus 110 while the bus is currently busy. In the exemplary embodiment, FIFO 202 is a four-deep queue which can store the tag number of the PCI core that requested the bus. In the exemplary PCI arbiter 200, the FIFO 202 is only used if the PCI bus 110 is currently busy with one of the PCI cores 210–213 when a different one of the PCI cores issues a PCI request.

A PCI core tag number is written into the request FIFO 202 under the following conditions:

1) The PCI core must not currently be locked;
2) The PCI core must be requesting the PCI Bus;
3) The PCI core must not currently have an entry in the request FIFO; and
4) The state machine 201 is not in the NO LOCK state (The PCI bus must currently be busy, as explained in detail below).

If the above four conditions are met, a record identifying the requesting PCI core is entered into the request FIFO 202.

The PCI arbiter 200 also records that this requesting core has been entered into the request FIFO 202 so that a request by the same PCI core is not entered into the FIFO again until the first request by the same PCI core is read out of the FIFO. Upon a read by the main state machine 201, the PCI arbiter 200 remembers that the requesting PCI core has been read from the request FIFO 202. This ensures that the requesting PCI core has only one entry in the request FIFO 202 at any given time.

Figure 5:
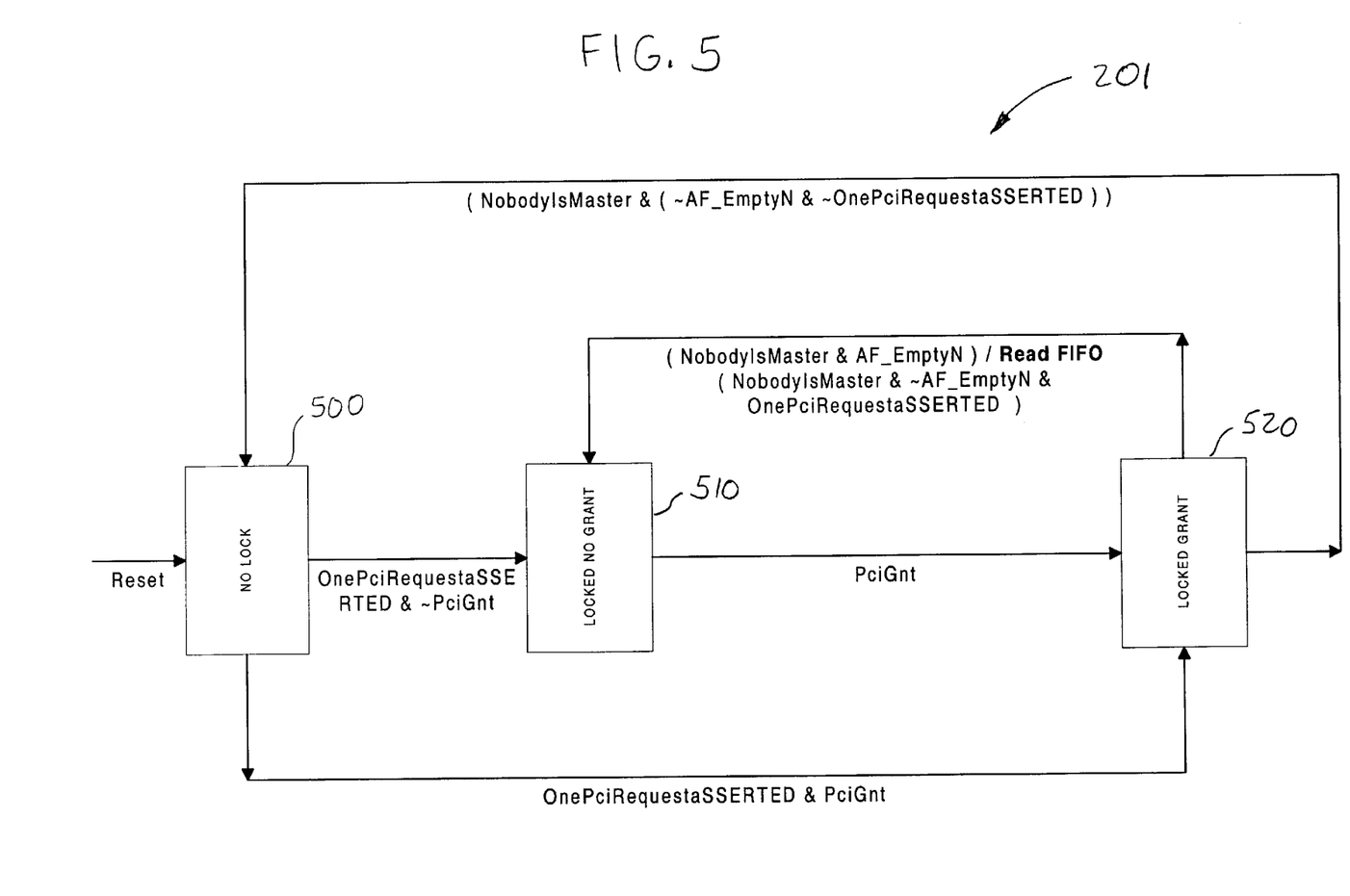
FIG. 5 is a state diagram of the state machine in the PCI arbiter shown in FIG. 4.

FIG. 5 is a state diagram showing the states and transitions of the PCI arbiter state machine. In FIG. 5, the tilde (~) indicates that the value of a logical variable is FALSE.

There are three main states: No Lock 500, Locked No Grant 510, and Locked Grant 520. The No Lock state 500 indicates that none of the PCI cores 210–213 is locked as the current PCI bus master. The Locked No Grant state 510 means that one PCI core is locked as the current bus master, but no PCI grant has been received. The Locked Grant state 520 means that one PCI core is locked as the current bus master, and the PCI grant has been received.

There are five pertinent logical variables (conditions) used by state machine 201: Reset, OnePciRequestaSSERTED, PciGnt, NobodyIsMaster, and AF_MasterN. In the exemplary embodiment, each of these five variables is represented by a signal. Reset may indicate either a chip reset or a software reset or both. OnePciRequestaSSERTED indicates that at least one (one or more) of the PCI cores 210–213 has asserted its PCI request. (The value of OnePciRequestaSSERTED is determined by taking the logical OR of the PCI request signals from all of the PCI cores 210–213.) PciGnt indicates that the main PCI grant is received from the system arbiter 102. NobodyIsMaster indicates that none of the PCI cores 210–213 is currently a PCI bus master. (The value of NobodyIsMaster is determined by inverting the logical OR of the McAmMasterN_coreN signals from each of the PCI cores 210–213. AF_EmptyN indicates that the FIFO 202 is not empty (has at least one pending request).

Upon a reset, the state machine 201 enters the No Lock state 500. The system remains in the No Lock state 500 until: at least one of the PCI cores 210–213 asserts its request signal (PciRequestN_core0, PciRequestN_core1, PciRequestN_core2, and PciRequestN_core3); PCI arbiter 200 submits the PciRequestN signal to the system arbiter 102; PCI arbiter 200 receives the PciGrantN signal from the system arbiter 102; and PCI arbiter 200 returns the PCI grant signal (PciGrantN_core0, PciGrantN_core1, PciGrantN_core2, or PciGrantN_core3) to the appropriate one of the PCI cores 210–213.

The system is in the No Lock state 500 when none of the PCI cores 210–213 is currently requesting the PCI bus 10 and none is currently using the bus; the system is not locked to any one PCI core being allowed bus access.

A transaction begins when at least one PCI request signal is asserted. The system can transition to either the Locked No Grant state 510 or the Locked Grant state 520 from the No Lock state 510. In either case, at least one of the PCI request signals is asserted. The system arbiter 102 is allowed to assert grants immediately as soon as a request is asserted—on the same clock cycle as the assert request. Thus, the system arbiter 102 may or may not assert the grant.

For example, if another device is using the PCI bus 110 when the PCI request is asserted, then the system arbiter 102 would not assert the grant on the same clock cycle as the request. Thus, the transition condition OnePciRequestaSSERTED & ~PciGnt is satisfied. The state machine would transition to the Locked No Grant state 510 and wait for the system arbiter 102 to assert its grant. When the system arbiter 102 issues the PCI grant (PciGrantN), the transition condition PciGnt is satisfied, and the state machine 201 transitions from the Locked No Grant state 510 to the Locked Grant state 520.

Alternatively, if the state machine is in the No Lock state 500, and no other device is currently requesting or using the PCI bus 110 when the PCI request is asserted, then the transition condition OnePciRequestaSSERTED & PciGnt is satisfied; the state machine can transition directly from the No Lock state 500 to the Locked Grant state 520. Thus, regardless of which transition path is followed, at least one PCI request must be asserted, and the grant has to be asserted to transition to the Locked Grant state 520.

When the state machine 201 is in the Locked Grant state, the PCI core that is currently the bus master is locked to doing any transaction on the PCI bus, and the other PCI cores are kept off the PCI bus. The arbiter essentially stops the grant from being transmitted to any of the PCI cores except for the core which is the current PCI bus master.

From the Locked Grant state 520, the state machine 201 can transition to either the No Lock state 500, or the Locked No Grant state 520. If the value of NobodyIsMaster is .TRUE., ~AF_EmptyN is .FALSE., and OnePciRequestaSSERTED is .FALSE., then the state machine transitions back to the No Lock state 500. This is the case without bus contention. In other words, if none of the PCI cores 210–213 is currently the PCI bus master, the FIFO is empty, and none of the PCI cores is currently asserting its request signal, then the system returns to the No Lock state 500 and awaits a PCI request.

If the system is in the locked grant state 520, and NobodyIsMaster is .TRUE., and AF_EmptyN is .FALSE., then the PCI arbiter 200 reads the next record from the FIFO 202, and transitions to the Locked No Grant state 510. In other words, upon completion of a data transfer by one of the PCI cores 210–213, if none of the PCI cores is currently PCI bus master, and there is at least one request pending in the FIFO queue 202, then the next request record is read from the FIFO. At the state transition labeled "READ FIFO" in the state diagram of FIG. 5, the request FIFO 202 is read. The PCI core identified in the next record of the request FIFO 202 at that time becomes the new bus master. The read control is embedded in the main state machine 201. Only the main state machine 201 knows when to read the data from the request FIFO 202 because the main state machine knows when the current bus master PCI core has just finished doing a transfer.

Alternatively, if the system is in the locked grant state 520, and NobodyIsMaster is .TRUE., ~AF_EmptyN is .FALSE., and OnePciRequestaSSERTED is .TRUE., then the PCI arbiter 200 transitions to the Locked No Grant state 510. In other words, if none of the PCI cores 210–213 is currently PCI bus master, and the FIFO 202 is empty, but one of the PCI cores is currently asserting its PCI request signal, then the state machine 201 returns to the Locked No Grant state. This case occurs if, on the same clock edge in which the NobodyIsMaster signal goes active, one of the PCI cores 210–213 requests the PCI bus. In this situation, there is no time to put the request in the FIFO 202. If the request is issued on the exact same clock edge that the other cores got off the bus, then the state machine 201 automatically assumes that the requestor issuing the request is next in line and transitions to the Locked No Grant state 500.

Using the foregoing PCI arbiter 200 with a FIFO, the average latency from the PCI cores 210–213 waiting for access to the PCI bus is minimized. PCI requests by the USB host controllers 220–223 are serviced in the order that the requests are made. This method results in shorter average latencies than a scheme such as least-recently-used (LRU) or round robin.

One characteristic of USB is that there are points at which the data transfers are sensitive to latencies. For example, in isochronous (streaming) mode, large amounts of data are send, and the host controller must accesses the PCI bus at very frequent intervals read data and send it out to a device. That means that it is very sensitive to latencies. In USB, in streaming mode, once the data transfer starts, it cannot pause; there is a constant stream of data that just appears on USB. In the PCI bus, the transfer from the USB looks like multiple requests with multiple grants being issued back to the host controller. If a large latency occurs in between two of those requests, the host controller can run out of data to send to the USB in a streaming mode. If the host controller runs out of data, that transaction is broken (lost). The system 100 described herein minimizes these latencies.

Based on the above description, one of ordinary skill can readily program a PCI arbiter state machine 201 to perform second tier arbitration among a plurality of requesters for a shared bus. The state machine may be implemented in a variety of microprocessors or microcontrollers, or may be implemented in an application specific integrated circuit (ASIC).

Figure 6:
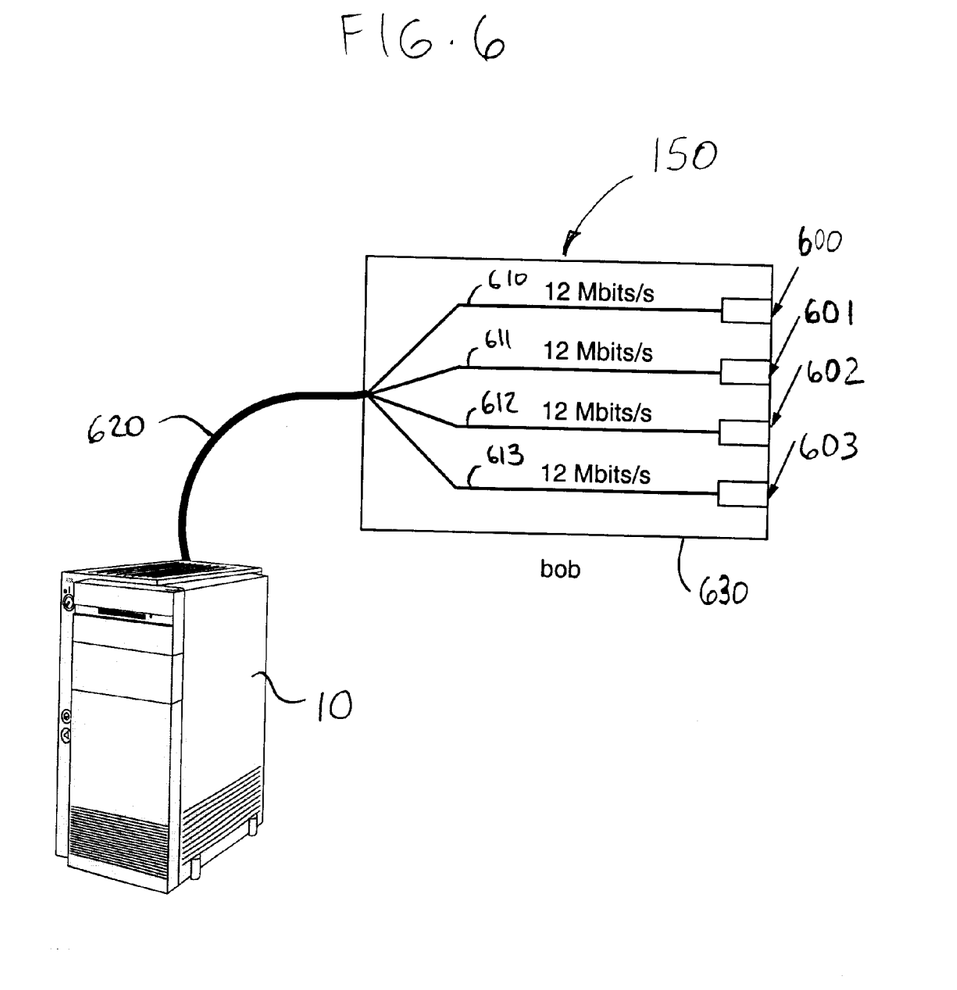
FIG. 6 is a diagram showing the breakout box (BOB) of FIG. 1.

FIG. 6 shows an exemplary breakout box 150 that may be used in a system according to the present invention. Breakout box 150 has a housing 630. The housing 630 has a plurality of USB ports 600–603 connected thereto. A plurality of cables 610–613 are included. Each of the plurality of cables 610–613 is connected at a first end to a respective one of the USB ports 600–603 (shown in FIG. 1). Each of the plurality of cables 610–613 has a second end remote and separately positionable from the housing 610. The second end of each of the plurality of cables 610–613 has a respective USB terminal 160–163 (shown in FIG. 1) connected thereto. Each of the plurality of cables 610–613 provides full-rate USB data transfer capability. The breakout box 150 further includes a sheath 620. At least a portion of each of the plurality of cables 610–613 is contained within the sheath 620.

Although the exemplary system includes OHCI host controller 120 capable of providing full-rate USB communications to four USB ports 140–143 and a breakout box 150 allowing remote access to the USB ports 140–143, OHCI host controller 120 may be used without the breakout box 150; USB hubs and devices may be directly attached to the USB ports 140–143. Similarly, the breakout box 150 may be used in computer systems that have a plurality of USB ports coupled to a single USB host controller; the breakout box 150 allows remote access to the USB ports, with a maximum combined data rate of 12 megabits/second or less.

Although the exemplary host controllers 220–223 are all implemented on a single chip, implementations in which each host controller resides in a respective (separate) chip are also contemplated. Similarly, implementations are contemplated having host controllers on two or more chips, each chip having two or more host controllers.

Figure 7:
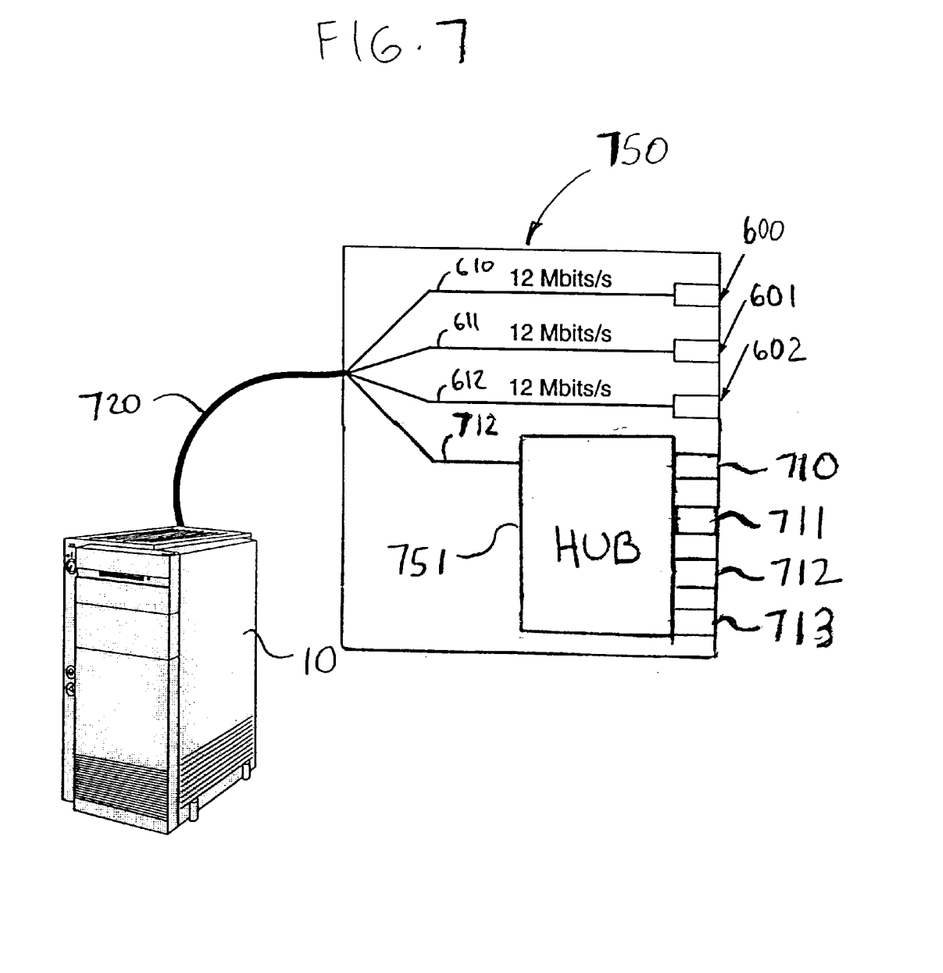
FIG. 7 is a diagram showing a variation of the BOB of FIG. 6.

Although the exemplary breakout box 150 has four cables 610–613 corresponding to four USB ports 600–603, any number of USB ports may be provided. Further, although the exemplary breakout box has the same number of USB ports 600–603 as USB terminals 160–63, the breakout box may incorporate hub functionality, and may include more downstream USB ports than upstream terminals. For example, a breakout box 750 (shown in FIG. 7) may have four upstream terminals corresponding to the four USB ports 140–143 of system 100 (shown in FIG. 1). One of the cables 712 in the breakout box 750 may be connected to a USB hub 751 (within the housing of the breakout box) having four downstream ports 710–713. Then the breakout box 750 would have three downstream full rate USB ports 600–602 and four more downstream ports 710–713 that would share a single USB host controller.

Although the exemplary embodiment includes four USB host controllers 220–223 coupled to a single PCI bus 110, the number of separate USB host controllers may be varied. For example, two, four, six or eight host controllers may be included. The number of available slots in the FIFO 202 of the system arbiter is sized to accommodate the appropriate number of requestors. One of ordinary skill in the art recognizes that using a large number of host controllers may increase latencies if multiple USB attached devices are concurrently performing isochronous (streaming) data transfers. These latencies are less likely to be observed if four or fewer USB host controllers are used, and are less likely to be observed while the USB host controllers are performing other types of data transfers (i.e., control transfers, bulk data transfers, or interrupt data transfers).

Although the exemplary system provides arbitration among a plurality of USB host controllers 220–223 seeking to access a shared PCI bus 110, the invention may be practiced in systems wherein requestors from any of a variety of types seeking access to a shared bus of any of a variety of types.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provided a unique device that operates analogously to specific logic circuits.

Although the invention has been described in terms of exemplary embodiments, it is not limited thereto. Rather, the appended claim should be construed broadly, to include other variants and embodiments of the invention which may be made by those skilled in the art without departing from the scope and range of equivalents of the invention.

What is claimed is:

1. Apparatus for controlling access to a PCI bus, comprising:
   a plurality of USB host controllers, each capable of being connected to a respective USB port;
   a plurality of PCI cores, each PCI core coupled to a respective one of the plurality of USB host controllers;
   a PCI arbiter coupled to each of the plurality of PCI cores, the PCI arbiter capable of arbitrating multiple requests for the PCI bus, each request being initiated by a respective communication from a respective one of the plurality of USB ports, wherein full-rate USB data transfer capability is provided between the PCI bus and each of the USB ports;

a first plurality of USB ports, each of the first plurality of USB ports being coupled to a respective one of the plurality of USB host controllers; and a breakout box coupled to the first plurality of USB ports, the breakout box being remotely positionable from the first plurality of USB ports, the breakout box including a second plurality of USB ports, wherein full-rate USB data transfer capability is provided between the PCI bus and each one of the second plurality of USB ports.

2. The apparatus of claim 1, wherein the breakout box includes:

a plurality of cables, each cable having a respective USB terminal capable of being connected to a respective one of the first plurality of USB ports, each cable being connected to a respective one of the second plurality of USB ports.

3. The apparatus of claim 2, wherein the second plurality of USB ports are located on the breakout box.

4. A breakout box, comprising:

a housing having a plurality of USB ports connected thereto;

a plurality of cables, each of the plurality of cables being connected at a first end inside the housing to a respective one of the USB ports, each of the plurality of cables having a second end remote and separately positionable from the housing, the second end of each of the plurality of cables having a respective USB terminal connected thereto, each of the plurality of cables providing full-rate USB data transfer capability.

5. The breakout box of claim 4, further comprising a sheath, wherein at least a portion of each of the plurality of cables is contained within the sheath.

6. The breakout box of claim 4, wherein each of the plurality of cables simultaneously provides full-rate USB data transfer capability.

7. The breakout box of claim 4, further comprising a USB hub within the housing, the USB hub having a single upstream cable and a plurality of downstream ports, the upstream cable having a remote end located proximate the second ends of the plurality of cables.

* * * * *